United States Patent [19]
Ochi et al.

[11] 4,430,142
[45] Feb. 7, 1984

[54] APPARATUS FOR ATTACHING A BOTTOM PLATE MADE OF A PLASTIC MATERIAL TO ONE END OF AN OPEN ENDED, HOLLOW CYLINDER MADE OF A PLASTIC MATERIAL

[75] Inventors: Takashi Ochi, Wako; Fumihiko Kaneko, Ibaraki, both of Japan

[73] Assignee: Sumitomo Bakelite Company et al., Japan

[21] Appl. No.: 214,817

[22] Filed: Dec. 9, 1980

[30] Foreign Application Priority Data

Mar. 6, 1980 [JP] Japan ................................ 55-27365

[51] Int. Cl.³ ............................................... B32B 31/20
[52] U.S. Cl. ................................. 156/379.9; 53/478; 53/486; 156/69; 156/198; 156/226; 156/274.4; 156/380.4; 156/380.5; 156/380.6; 156/475; 156/567; 156/583.1; 156/477.1; 428/35
[58] Field of Search ............. 53/478, 486; 156/69, 156/273, 567, 198, 226, 380, 379.9, 380.4, 380.5, 380.6, 274.4, 583.1, 475, 477 R; 428/35

[56] References Cited

U.S. PATENT DOCUMENTS

| | | | |
|---|---|---|---|
| 3,045,743 | 7/1962 | Hillegas | 156/567 |
| 3,547,012 | 12/1970 | Amberg et al. | 156/69 X |
| 3,673,033 | 6/1972 | MacDaniel et al. | 156/567 X |
| 4,033,801 | 7/1977 | Gros | 156/273 X |

FOREIGN PATENT DOCUMENTS

838719 6/1960 United Kingdom .
963589 7/1964 United Kingdom .

Primary Examiner—Robert A. Dawson
Attorney, Agent, or Firm—Karl W. Flocks; SHeridan Neimark

[57] ABSTRACT

A method of securing a bottom plate made of a plastic material to one end of an open-ended, hollow cylinder made of a plastic material to produce a plastic cylindrical container, wherein the bottom plate is held in a horizontal position and the open-ended, hollow cylinder having an inner diameter slightly larger than the diameter of the bottom plate is positioned in enclosing relation to the bottom plate in such a manner that a portion of the cylinder projects upwardly a predetermined distance from the bottom plate. The upwardly projecting portion is heated and softened and bent radially inwardly into contact with an outer marginal portion of the bottom plate. The bent portion of the cylinder maintained in contact with the outer marginal portion of the bottom plate is pressed and heated, so as to join them by the fusion thereof. An apparatus suitable for carrying such method into practice includes a rotatable table on which a series of working stations are located for carrying out the process steps by a series of devices for continuously producing plastic cylinderical containers on a mass production basis.

6 Claims, 15 Drawing Figures

APPARATUS FOR ATTACHING A BOTTOM PLATE MADE OF A PLASTIC MATERIAL TO ONE END OF AN OPEN ENDED, HOLLOW CYLINDER MADE OF A PLASTIC MATERIAL

BACKGROUND OF THE INVENTION

This invention relates to a method of attaching a bottom plate made of a plastic material to one end of an open-ended, hollow cylinder made of a plastic material and an apparatus suitable for carrying such method into practice.

Figure 1A:
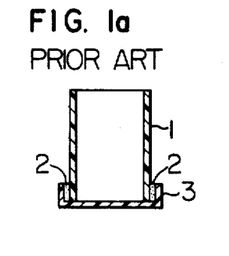
FIGS. 1a–1c are schematic views in explanation of the prior art for attaching a bottom plate made of a plastic material to one end of an open-ended, hollow cylinder made of a plastic material.
Figure 1B:
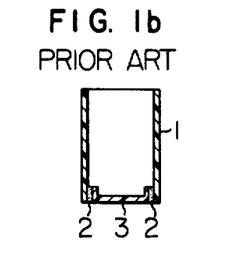
Figure 1C:
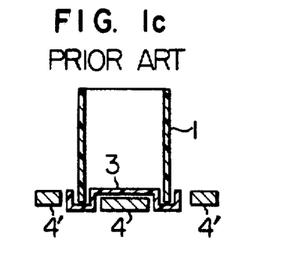

In one method known in the art of attaching a bottom plate made of a plastic material to one end of an open-ended, hollow cylinder made of a plastic material to obtain a plastic cylindrical container, (see FIGS. 1a and 1b) a bonding agent 2 is applied to a fitting portion of a bottom plate 3 to be fitted to an outer wall surface or an inner wall surface of a cylinder 1 and the cylinder 1 and the bottom plate 3 are bonded together to thereby obtain the plastic cylindrical container. In another method (see FIG. 1c), the cylinder 1 is fitted in a peripheral groove formed in the bottom plate 3 to receive the cylinder 1 and a seal is provided by using high frequency techniques in which high frequency electrodes plates 4 and 4' are pressed against the cylinder 1 and the bottom plate 3. Some disadvantages are associated with these known methods. In the method using a bonding agent, the bonding agent used which have deleterious effects may migrate to the contents of the cylindrical container, the bonding agent used may be so low in bond strength that the containers produced may not be suitable for practical use, and the bond provided may vary from container to container, thereby reducing productivity. Moreover, the use of a bonding agent requires a bonding agent applying step in the method. Meanwhile the method of using high frequency techniques disclosed in Japanese Patent Gazette No. 13118/66 which is shown in FIG. 1c requires a complex mechanism for providing a high frequency welding and raises the problem of maintenance. Also, the strength of the seal provided by high frequency techniques varies from one container to another, and it has hitherto been impossible to obtain stability in the quality of the products.

Further, in another prior art of Japanese Patent Publication No. 29146/79, since a bottom plate receiving portion formed at the end of a plastic hollow cylinder is prepared mainly by using the shrinkage property of the plastic cylinder caused by the heating thereof, there had been occurred such defects that the configuration of the end of a resultant cylinder vessel varys, the quality thereof being not stable and the productivity thereof being reduced.

SUMMARY OF THE INVENTION

It is an object of this invention to obviate the aforesaid disadvantages of the prior art, to provide a method of attaching a bottom plate made of a plastic material to one end of an open-ended, hollow cylinder made of a plastic material to produce in high productivity a plastic cylindrical container having strong joined portion and uniform qualities, and to provide an apparatus suitable for carrying such method into practice.

According to the invention, there is provided a method of attaching a bottom plate made of a plastic material to one end of an open-ended, hollow cylinder made of a plastic material comprising the steps of holding the bottom plate in a horizontal position, positioning the open-ended, hollow cylinder in enclosing relation to the bottom plate in such a manner that a portion of the open-ended, hollow cylinder projects upwardly a predetermined distance from the bottom plate, said open-ended, hollow cyinder having an inner diameter slightly larger than the diameter of the bottom plate, heating and softening the upwardly projecting portion of the open-ended, hollow cylinder and bending same radially inwardly into contact with an outer marginal portion of the bottom plate, and joining both the bent portion of the open-ended, hollow cylinder and the outer marginal portion of the bottom plate by heating and applying pressure thereto.

According to the invention, there is provided an apparatus comprising a rotatable table, a plurality of bottom plate support posts each for supporting a bottom plate made of a plastic material to be attached to one end of an open-ended, hollow cylinder for producing a plastic cylindrical container the bottom plate support posts being at least six in number and arranged equidistantly from one another in an outer marginal portion of the rotatable table and having an outer diameter slightly smaller than the inner diameter of the open-ended, hollow cylinder to be formed into a plastic cylindrical container, means located in a first working station for placing one bottom plate made of a plastic material on each bottom plate support post, means located in a second working station for positioning one open-ended, hollow cylinder made of a plastic material in enclosing relation to each bottom plate support post and moving the open-ended, hollow cylinder downwardly until a portion, which is to be joined by the fusion thereof, of the open-ended, hollow cylinder is just projected unwardly from the top of the bottom plate support post, means located in a third working station for heating and bending radially inwardly the portion to be joined of the open-ended, hollow cylinder, means located in a fourth working station for joining both the radially inwardly bent portion of the open-ended, hollow cylinder and the bottom plate both made of a plastic material to produce a bottomed, hollow cylinder, means located in a fifth working station for cooling the joined portion of the bottomed, hollow cylinder, and means located in a sixth working station for removing the bottomed, hollow cylinder from the rotatable table as a plastic cylindrical container produced by the apparatus.

An open-ended, hollow cylinder made of a plastic material may be produced by cutting a sheet of plastic material to sutable lengths and bonding by adhesive or welding end portions of each length of the cut plastic sheet after rounding same into a cylindrical shape, or extruding a tube of a plastic material by means of an extruder and cutting same into suitable lengths. Alternatively the apparatus described in Japanese Patent Gazette No. 33516/75 (corresponding to U.S. Pat. No. 3,671,360 and German Pat. No. 1,036,450) may be used for producing open-ended, hollow cylinders. Preferably the bottom plate is made of the same plastic material as the open-ended, hollow cylinder and has substantially the same thickness as the open-ended, hollow cylinder. However, any plastic materials may be selected so long as the welding of the bottom plate and the open-ended, hollow cylinder can be achieved. The temperature at which heating is carried out to radially inwardly bend the portion to be joined of an open-ended, hollow cylinder made of a plastic material is preferably the softening temperature of the plastic material used or a temperature in the vicinity of the softening point. Heating may be effected by means of a hot blast or an infrared heating device. In the present invention, however, the use of a metal die having a built-in heater and serving concurrently as joined portion bending means is desirable. Means for joining a bottom plate made of a plastic material to an open-ended, hollow cylinder made of a plastic material by the welding thereof include ultrasonic welding means, high frequency welding means, impulse sealing means and heat sealing means. Considering the productivity and increased stability of the quality of products, high frequency welding means is preferred. No limitations are placed on the thickness of the open-ended, hollow cylinder and the bottom plate so long as welding is feasible and the container produced has enough stiffness. In view of the desirability of reducing cost, the thickness is preferably in the range between 0.1 and 1.0 mm. The joined portion tends to have strain and may be deformed if left untreated, so that it is required to cool the joined portion. The cooling time may vary depending on the plastic material used and the thickness thereof. Cooling may be effected by bringing a plate or a metal die having cooling water flowing therethrough into contact with the joined portion or by flowing compressed air against the joined portion. The plastic material used in the invention may advantageously be selected from the group consisting of polyvinyl chloride (PVC), polyvinyl acetate (PVA), polyvinylidene chloride (PVDC), polystyrene (PS), polyvinyl alcohol (PVA), polyamides (Ny), polypropyrene (PP), polyester (PET), polycarbonate (PC) and saponified ethylene-vinyl-acetate-copolymer (EVAL), or a composite material in which at least two of these plastic materials are coated each other or formed into a laminate. A laminate of three layers of these plastic materials may include PE/PVC/PE, PP/EVAL/PP, PP/EVAL/PP and PS/EVAL/PS.

A cylindrical container produced by the method according to the invention may be used as a container having a lid that can be freely opened and closed, or as a sealed container if such lid is secured to the end thereof. The cylindrical container produced by the method according to the invention may also be used as a cover for another container to serve as a duster, for example.

DETAILED DESCRIPTION OF THE PREFERRED EMBODIMENT

Figure 2A:
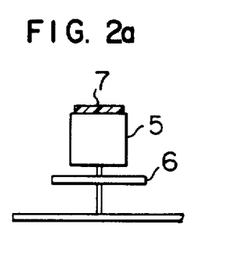
FIGS. 2a–2c are schematic views in explanation of the method according to the invention for joining a bottom plate made of a plastic material to one end of an open-ended, hollow cylinder made of a plastic material.
Figure 2B:
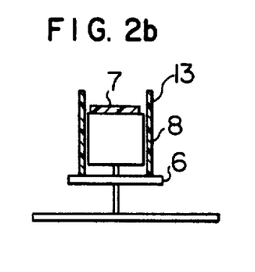
Figure 2C:
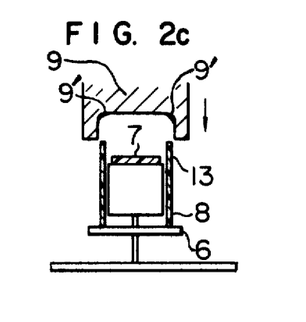
Figure 2D:
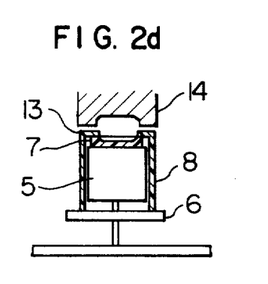
Figure 2E:
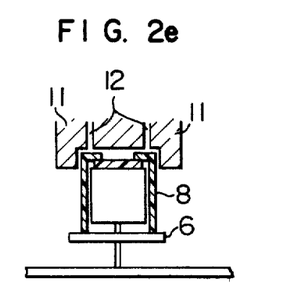

One embodiment of the method in conformity with the invention for joining a bottom plate made of a plastic material to one end of an open-ended cylinder made of a plastic material will now be described by referring to the drawings. In FIG. 2a, a bottom plate 7 made of polyvinyl chloride and having a diameter of 79 mm and a thickness of 0.4 mm is placed on a bottom plate support post 5 having an outer diameter of 79.8 mm slightly smaller than the inner diameter of an open-ended cylinder 8 made of a polyvinyl chloride and having an inner diameter of 80 mm, a wall thickness of 0.4 mm and a height of 100 mm. As shown in FIG. 2b, the open-ended cylinder 8 is placed on a support deck 6 in enclosing relation to the bottom plate 7 so that the inner wall surface of the cylinder 8 is brought into contact with the side of the bottom plate support post 5. In this case, the height of the cylinder support deck 6 is adjusted beforehand in such a manner that an upper end of a portion 13 to be joined is projected 3.5 mm higher than the top of the bottom plate support post 5. After the cylinder 8 is placed on the support deck 6, a bending die 9 having a recess of substantially the same shape as the bottom portion of a cylindrical container to be produced and heated to 110° C. is brought, as shown in FIG. 2c, into contact with the portion 13 so as to heat same alone. The die 9 is further moved downwardly so that the portion to be joined will be bent inwardly along round portion 9' in the recess. Upon completion of bending of the portion 13 to be joined, the cylinder 8 is moved to a position immediately beneath a welding device 14 serving concurrently as a high frequency anode terminal, and an air cylinder-piston arrangement, not shown, of a known construction having a diameter of 40 mm and connected to an upper portion of the welding device 14 is actuated to move the device 14 downwardly, to hold the bent portion 13 and the bottom plate 7 between the device 14 and the bottom plate support post 5 serving concurrently as a high frequency cathode terminal. A high frequency current of 1 kilowatt and 40 megahertz is passed between the two electrode terminals and through the portion 13 to be joined and the bottom plate 7 in contact with each other and at the same time a pressure of 2 kg/cm² as measured in a gauge pressure of the air cylinder-piston arrangement is applied to the bent portion 13 and a portion of the bottom plate 7 in contact therewith for one second, to weld the portion 13 and the bottom plate 7 together.

Figure 3:
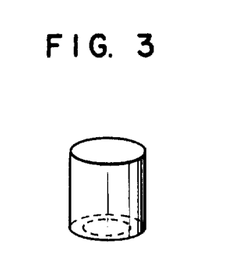
FIG. 3 is a perspective view of a cylindrical container produced by the method according to the invention.

The welded portion is cooled by blowing air thereagainst from an air ejecting opening 12 of a cooling die 11 of substantially the same shape as the bottom portion of a cylindrical container to be produced. Following completion of cooling, a cylindrical container made of a plastic material having a bottom plate firmly joined thereto as shown in FIG. 3 is obtained.

One embodiment of the apparatus in conformity with the invention suitable for carrying into practice the method of welding a bottom plate made of a plastic material to one end of an open-ended, hollow cylinder will now be described in detail by referring to FIGS. 4–8. The embodiment comprises a rotatable table 21, a plurality of cylinder support decks 23 disposed on the table 21 and each supporting one open-ended cylinder thereon, and a plurality of bottom plate support posts 27 each disposed in upstanding position on one of the cylinder support decks 23 for supporting one bottom plate 7 thereon. Each bottom plate support posts 27 includes a disk-shaped portion of a diameter of 79.8 mm for supporting thereon one bottom plate 7 of a diameter of 79 mm, a rod-shaped portion having the disk-shaped portion connected to its upper part, and another disk-shaped portion of the same diameter and substantially the same shape as the first-mentioned disk-shaped portion connected to the lower end of the rod-shaped portion. The distance between the top of the disk-shaped portion at the upper end of the rod-shaped portion and the surface of the cylinder support deck 23 is set beforehand at 96.5 mm by taking into consideration the height of the cylindrical container obtained as a product. The bottom plate support posts 27 are at least six in number and arranged in an outer marginal portion of the table 21 substantially equidistantly from one another. Devices having the functions to be described below are each located above one of the six bottom plate support posts 27.

Figure 5:
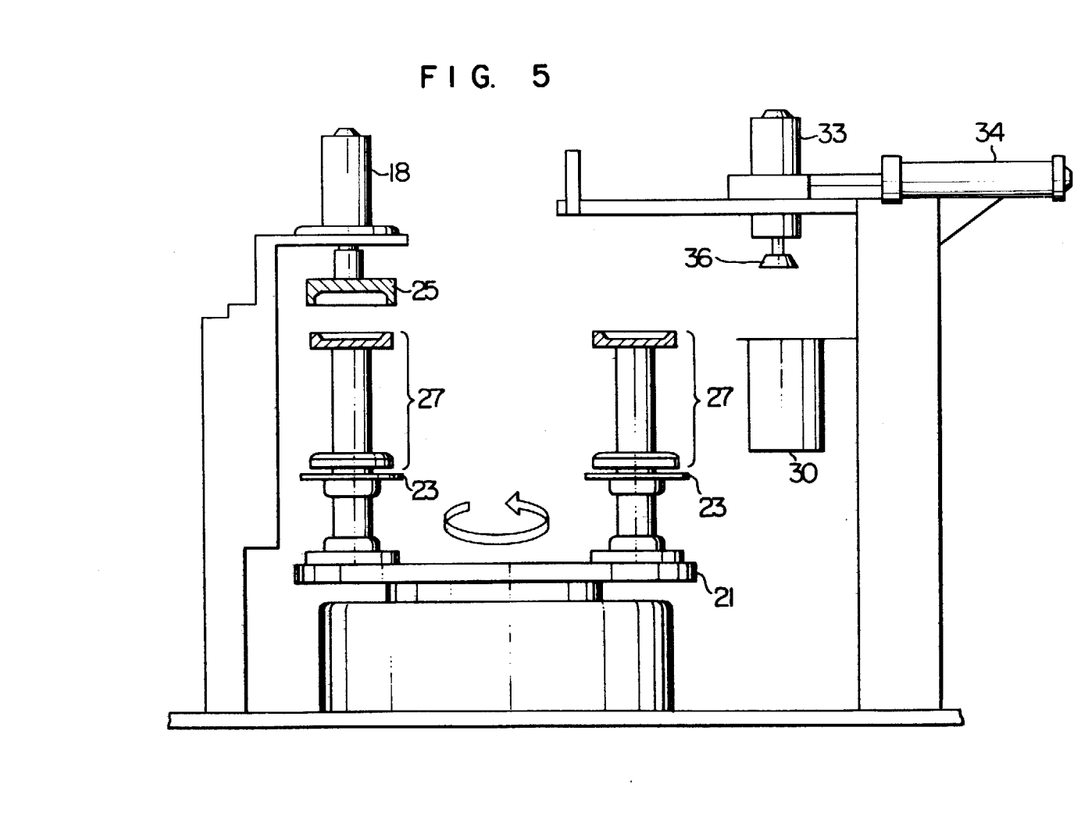
FIG. 5 is a sectional view taken along the line V—V in FIG. 4.
Figure 8A:
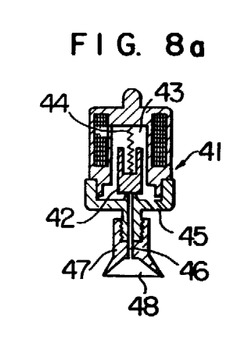
FIGS. 8a and 8b are sectional views of the sucking device used in the apparatus according to the invention, showing the device in an operative position and in an inoperative position respectively.
Figure 8B:
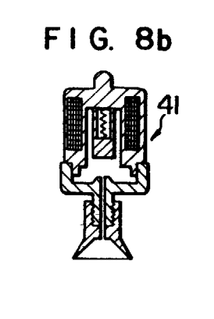

(A) In a position above the bottom plate support post 27 disposed on the right in FIG. 5, a cylinder-piston arrangement 33 having a sucking device 36 attached to its lower end and capable of vertical movement and a cylinder-piston arrangement 34 cooperating with a guide member for moving the cylinder-piston arrangement 33 horizontally are mounted. As shown in FIGS. 8a and 8b, the sucking device 36 includes an electromagnetic valve 41 of known construction formed therein with a hollow space 43 being in communication with outside through a small opening 45 and through a vertical bore 46 in communication with a conical portion 48 of a sucker 47 made of rubber for performing a sucking action. A valve member 42 and a compression spring 44 mounted between the valve member 42 and a housing of the electromagnetic valve 41 are arranged in the hollow space 43. When no current is passed to the electromagnetic valve 41, the valve member 42 closes one end of the vertical bore 46 as shown in FIG. 8a; when current is passed to the electromagnetic valve 41, the one end of the vertical bore 46 remains open to allow the conical portion 48 to communicate with the vertical bore 43 and small opeing 45. Referring to FIG. 5 again, a bottom plate case 30 containing a plurality of bottom plates 7 therein is disposed in a position above which the sucking device 36 is located when the latter is moved radially outwardly of the table 21.

Operation of the sucking device 36 will be described. Actuation of the cylinder-piston arrangement 33 moves the sucking device 36 downwardly to take one bottom plate 7 out of the bottom plate case 30 and then upwardly with the bottom plate 7. At this time, the electromagnetic valve 41 has no current passed thereto as shown in FIG. 8a so that when the conical portion 48 of the sucker 47 is pressed down against the flat bottom plate 7 the bottom plate 7 is securely held fast to the sucker 47 because the vertical bore 46 is closed. Then the sucking device 36 is moved leftwardly (in the figure as hereinafter to be referred to) to a position in which the device 36 is exactly above the bottom plate support post 27. Thereafter the sucking device 36 is moved downwardly by the action of the cylinder-piston arrangement 33 to place the bottom plate 7 on the top of the bottom plate support post 27, and current is passed to the electromagnetic valve 41 to render same operative as shown in FIG. 8b so that the sucker 47 loses its sucking function and the conical portion 48 releases the bottom plate 7. The sucking device 36 from which the bottom plate 7 is released is moved upwardly by the action of the cylinder-piston arrangement 33 and then moved rightwardly to its original position by the cylinder-piston arrangement 34.

Figure 4:
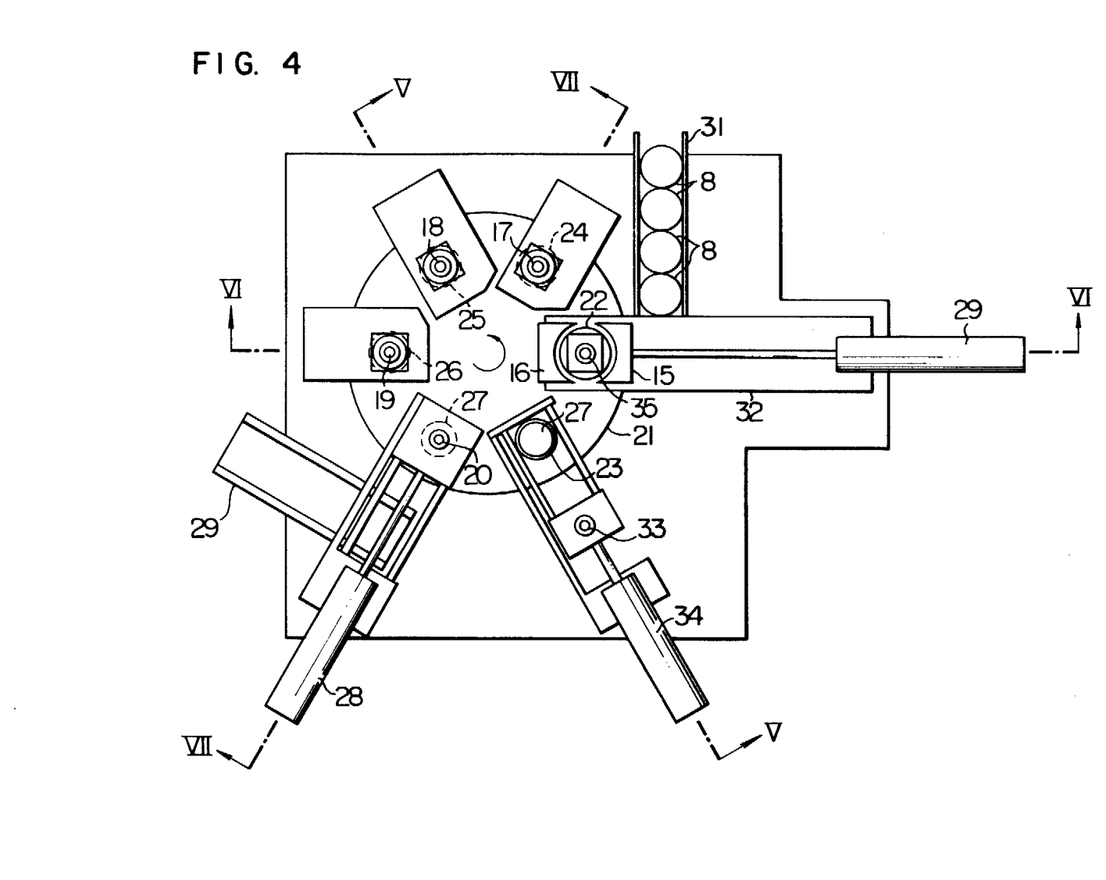
FIG. 4 is a plan view of one embodiment of the apparatus suitable for carrying the method according to the invention into practice.
Figure 6:
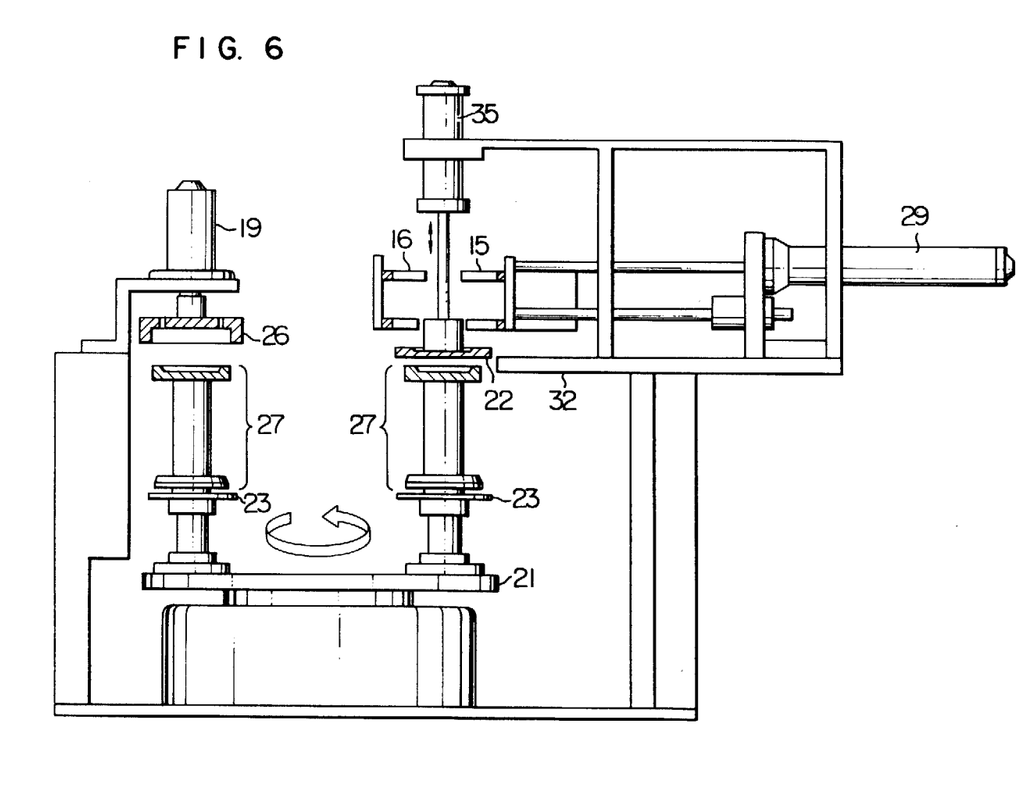
FIG. 6 is a sectional view taken along the line VI—VI in FIG. 4.

(B) As shown on the right side of FIGS. 4 and 6 there are mounted a belt conveyor 31 for successively moving the open-ended cylinders 8 to a position on the right side of the bottom plate support post 27, a cylinder-piston arrangement 29 including a piston rod movable leftwardly and rightwardly and having attached to its end a cylinder guide 15 of a shape corresponding to the shape of side wall of the hollow cylinder 8 so as to move each hollow cylinder in a leftward direction, a cylinder stopper 16 of substantially the same shape as the cylinder guide 15 located in a position on the left side of the bottom plate support post 27 to enable each cylinder to be positioned exactly above the bottom plate support post 27, and a cylinder-piston arrangement 35 including a piston rod movable vertically and having attached to its end a push plate 22 for positioning each cylinder in enclosing relation to the bottom plate 7 on the bottom plate support post 27 when the cylinder is disposed exactly above the bottom plate support post 27 and pushing the cylinder downwardly until it reaches the cylinder support deck 23. The open-ended cylinders 8 in upright position are fed one by one by the belt conveyor 31 to a predetermined position and moved by the cylinder guide 15 to a position exactly above the bottom plate support post 27. As the cylinder guide 15 moves to its original position, the push plate 22 is moved downwardly to move one cylinder into enclosing relation to the bottom plate 7 on the bottom plate support post 27, and then pushed the cylinder down until the latter reaches the cylinder support deck 23. In this case, the upper end portion to be joined of each cylinder extends upwardly from the top of the bottom plate support post 27 by 3.5 mm.

Figure 7:
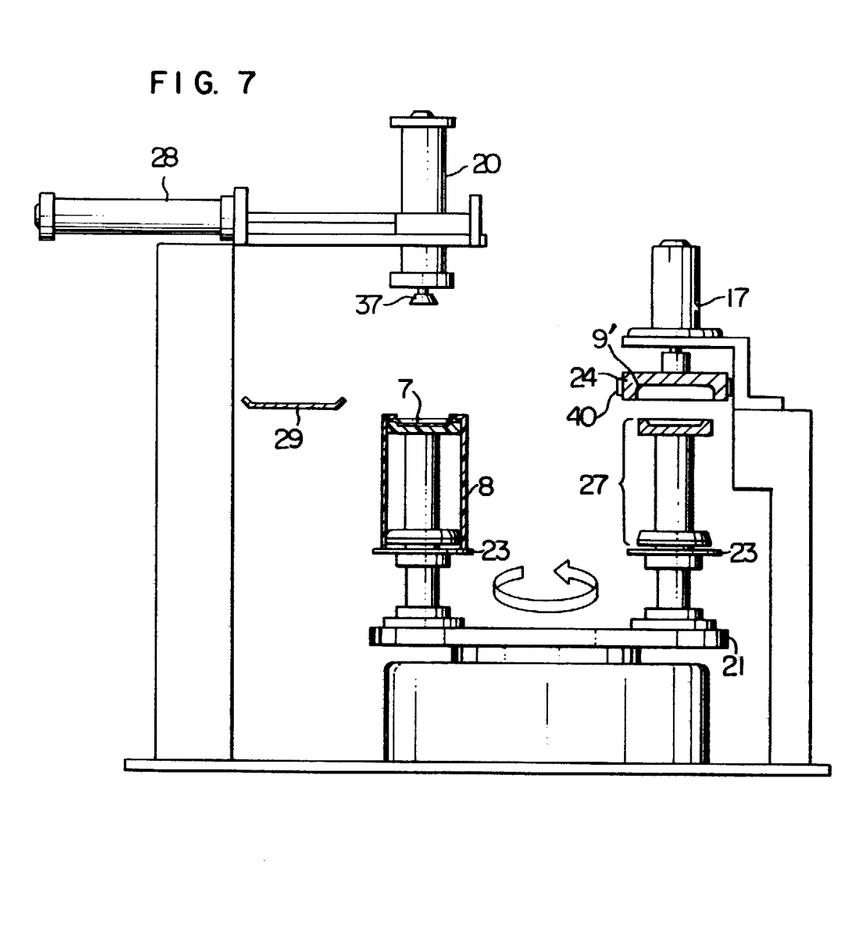
FIG. 7 is a sectional view taken along the line VII—VII in FIG. 4.

(C) On the right side of FIG. 7, a bending female die 24 is disposed exactly above the bottom plate support post 27. The die 24 which is recessed substantially in the same shape as the bottom portion of a cylindrical container to be produced and which is provided with a heater 40 at its outer periphery for heating and inwardly bending the upwardly extending portion to be joined of the cylinder 8 is connected to a piston rod of a cylinder-piston arrangement 17 capable of moving vertically. The bottom plate support post 27 shown in FIG. 7 has one bottom plate 7 placed thereon and one cylinder 8 is positioned in enclosing relation to the bottom plate 7 with the portion to be joined extending upwardly by 3.5 mm from the top of the bottom plate support post 27. In this condition, the bending female die 24 moves downwardly to heat and bend inwardly the portion to be joined and returns to its original position after moving downwardly to a position in which the portion to be joined and the bottom plate 7 are pressed by the female die 24 against the bottom plate support post 27. At this time, the joining of the cylinder 8 and the bottom plate 7 is not effected yet, but they are shaped into a cylindrical container. The bending female die 24 is formed in its recess with a rounded portion 9' which is brought into contact with the portion to be joined before it is bent inwardly, so that the heated upwardly extending portion is bent radially inwardly by the rounded portion 24' when pressure is applied by the female die 24.

(D) On the left side of FIG. 5, a welding device 25 comprising an annular die serving concurrently as a high frequency anode terminal for welding both the inwardly bent portion of the cylinder 8 and the bottom plate 7 is located. The welding device 25 is connected to a cylinder-piston arrangement 18 for vertical movement and disposed exactly above the bottom plate support post 27 serving concurrently as a high frequency cathode terminal. As the welding device 25 moves downwardly, a high frequency device of an output of 1 kilowatt and a frequency of 40 megahertz is actuated while a pressure (which is 2 kg/cm$^2$ in a gauge pressure of a cylinder of 40 mm in diameter) is applied to both the portion to be joined and the bottom plate 7 held between the bottom plate support post 27 and the joining device 25, to produce a cylindrical container. The cylinder-piston arrangement 18 is moved upwardly to return the welding device 25 to its original position.

(E) On the left side of FIG. 6, a cylinder-piston arrangement 19 for vertical movement has connected to the end of its piston a cooling die 26 recessed substantially in the same shape as the bottom portion of a cylindrical container and formed with an air ejecting opening for directly cooling the welded portion of the cylindrical container. In this station, the bottom plate support post 27 has placed thereon a cylindrical container which has its bottom joined to the cylinder but the welded portion of the cylindrical container is still high in temperature and liable to be distorted. Thus to avoid deformation of the cylindrical container, the cooling die 26 is moved downwardly to correct its shape while cooling the welded portion with compressed air ejected through the air ejecting opening, so as to produce the cylindrical container correct in shape. In place of the air cooling die, a die of the water cooling system may be used. In this case, the cooling die may be brought into pressure engagement with the cylindrical container to cool and correct the shape of the cylindrical container.

(F) On the left side of FIG. 7, a cylinder-piston arrangement 20 for vertical movement has connected to the end of its piston rod a sucking device 37 of the same construction as the sucking device 36 described in paragraph (A). As the cylinder-piston arrangement 20 is actuated, the sucking device 37 is moved downwardly to hold the cylindrical container on the bottom plate support post 27 which has the bottom plate 7 joined to the cylinder 8. Then the sucking device 37 having the cylindrical container held fast thereto is moved upwardly. Then another cylinder-piston arrangement 28 is actuated to move the cylindrical container leftwardly together with the sucking device 37. The sucking device 37 is moved downwardly when it has reached a position above an ejecting tray 29, and an electromagnetic valve is actuated to release the cylindrical container and place same on the ejecting tray 29. Thereafter the sucking device 37 is moved upwardly by the cylinder-piston arrangement 20 and returned to its original position by the cylinder-piston arrangement 28, thereby completing the production of a cylindrical container.

The component parts of the apparatus and the process steps followed in the method for attaching a bottom plate made of a plastic material to an open-ended, hollow cylinder have been described hereinabove. It is to be understood that the process steps are not followed intermittently but carried out simultaneously. Thus the rotatable table 21 having the bottom plate support posts 27 mounted thereon rotates clockwise in FIG. 4 through 1/6 of 360°, that is, 60° at the end of one step to continuously produce cylindrical containers.

The cylinder-piston arrangements used in the invention may be either of a pneumatic type or a hydraulic type. In the embodiment of the apparatus described hereinabove, means for placing one bottom plate on each bottom plate support post and means for positioning one cylinder on each bottom plate support post may have their orders reversed.

The number of cylindrical containers produced by the method according to the invention may vary depending on the plastic material used and the thickness of the plastic sheet. However, the production rate may achieve a maximum of 600 pieces per hour. The invention enables plastic cylindrical containers to be produced on a mass production basis by means of welded instead of the usual adhesive bonding, so that the products are low in cost, easy to produce and devoid of variations in quality.

What is claimed is:

1. An apparatus for securing a bottom plate made of a plastic material to one end of an open-ended, hollow cylinder comprising:

a rotatable table;

a plurality of bottom plate support posts each for supporting a bottom plate made of a plastic material to be welded to one end of an open-ended, hollow cylinder for producing a plastic container, said bottom plate support posts being at least six in number and arranged equidistantly from one another in an outer marginal portion of said rotatable table; and having an outer diameter slightly smaller than the inner diameter of the open-ended, hollow cylinder to be formed into a plastic container;

means located in a first working station for placing one bottom plate made of a plastic material on each bottom plate support post;

means located in a second working station for positioning one open-ended, hollow cylinder made of a plastic material in enclosing relation to each bottom plate support post and moving the open-ended, hollow cylinder downwardly until a portion alone of the open-ended, hollow cylinder to be welded is disposed above the bottom plate support post;

means located in a third working station for heating and bending radially inwardly the portion to be welded, comprising a metallic die recessed in substantially the same shape as the bottom portion of the open-ended, hollow cylinder, a heater mounted in an outer marginal position of said metallic die, and a cylinder-piston arrangement for vertically moving said metallic die, said recessed portion of said metallic die being rounded in a portion thereof which is brought into contact with the portion of be welded of each open-ended, hollow cylinder not bent yet, whereby the portion to be welded is bent inwardly by contact with said rounded portion of said recessed portion of said metallic die;

means located in a fourth working station for welding together the radially inwardly bent portion of the open-ended, hollow cylinder and the bottom plate both made of a plastic material to produce a bottomed, hollow cylinder, comprising a metallic die serving concurrently as a high frequency anode terminal cooperating with each bottom plate support post serving concurrently as a high frequency cathode terminal, a cylinder-piston arrangement for vertically moving said metallic die for applying pressure to the portion to be welded of each open-ended, hollow cylinder and each bottom plate held between said high frequency anode terminal and said high frequency cathode terminal, and a high frequency device for passing high frequency current between said anode terminal and said cathode terminal;

means located in a fifth working station for cooling the welded portion of the bottomed, hollow cylinder; and means located in a sixth working station for removing the bottomed, hollow cylinder from the rotatable table as a cylindrical plastic container produced by the apparatus.

2. An apparatus as claimed in claim 1, wherein said means located in the first working station for placing one bottom plate on each bottom plate support post comprises a suction device including an electromagnetic valve, a first cylinder-piston arrangement for vertically moving said suction device, and a second cylinder-piston arrangement for moving said suction device radially of said rotatable table.

3. An apparatus as claimed in claim 1 or 2, wherein said means located in the second working station for positioning one open-ended, hollow cylinder in enclosing relation to each bottom plate support post comprises an endless belt conveyor for conveying an open-ended, hollow cylinder to one side of each bottom plate support post, a cylinder guide for guiding the movement of each open-ended, hollow cylinder to a position immediately above each bottom plate support post, a first cylinder-piston arrangement for moving said cylinder guide, and a second cylinder-piston arrangement for moving the open-ended, hollow cylinder disposed above each bottom plate support post downwardly so that each bottom plate support post is enclosed by the open-ended, hollow cylinder.

4. An apparatus as claimed in claim 1, wherein said means located in the fifth working station for cooling the welded portion of each open-ended, hollow cylinder and each bottom plate comprises a metallic die recessed in the same shape as the bottom portion of each bottomed, hollow cylinder and formed with an air ejecting opening in said recessed portion, and a cylinder-piston arrangement for vertically moving said metallic die.

5. An apparatus as claimed in claim 4, wherein said means located in the sixth working station for removing each bottomed, hollow cylinder as a hollow cylindrical container comprises a sucking device capable of holding fast to the bottom of each bottomed, hollow cylinder and including an electromagnetic valve for rendering said sucking device inoperative, a first cylinder-piston arrangement for vertically moving said sucking device, and a second cylinder-piston arrangement for moving said sucking device radially of said rotatable table.

6. An apparatus for securing a bottom plate made of a plastic material to one end of an open-ended, hollow cylinder made of a plastic material, comprising:

means for holding the bottom plate in a horizontal position;

means for positioning the open-ended, hollow cylinder in enclosing relation to the bottom plate in such a manner that a portion of the open-ended, hollow cylinder projects upwardly a predetermined distance from the bottom plate, said open-ended, hollow cylinder having an interdiameter slightly larger than the diameter of the bottom plate;

means for heating and softening the upwardly projecting portion of the open-ended, hollow cylinder and for bending same radially inwardly into contact with an outer marginal portion of the bottom plate, said means comprising a die having a heater; and means for high frequency welding together the bent portion of the open-ended, hollow cylinder and the outer portion of the bottom plate by heating and applying pressure thereto, said means comprising an anode terminal and a cathode terminal.

* * * * *